US010611949B2

(12) United States Patent
Cadix et al.

(10) Patent No.: US 10,611,949 B2
(45) Date of Patent: Apr. 7, 2020

(54) ENCAPSULATED ACTIVATOR AND ITS USE TO TRIGGER A GELLING SYSTEM BY PHYSICAL MEANS

(71) Applicant: RHODIA OPERATIONS, Aubervilliers (FR)

(72) Inventors: Amaud Cadix, Saint Ouen (FR); Rabih Rached, Millery (FR); Pierre Ardaud, Sainte-foy-les-Lyon (FR)

(73) Assignee: RHODIA OPERATIONS, Paris (FR)

( * ) Notice: Subject to any disclaimer, the term of this patent is extended or adjusted under 35 U.S.C. 154(b) by 144 days.

(21) Appl. No.: 15/292,277

(22) Filed: Oct. 13, 2016

(65) Prior Publication Data

US 2017/0029690 A1 Feb. 2, 2017

Related U.S. Application Data

(62) Division of application No. 14/004,304, filed as application No. PCT/EP2012/053970 on Mar. 8, 2012, now Pat. No. 9,499,719.

(30) Foreign Application Priority Data

Mar. 11, 2011 (EP) ..................... 11157866

(51) Int. Cl.
| | |
|---|---|
| *C09K 8/516* | (2006.01) |
| *C09K 8/508* | (2006.01) |
| *C09K 8/575* | (2006.01) |
| *C09K 17/18* | (2006.01) |
| *C09K 17/48* | (2006.01) |
| *C09D 175/14* | (2006.01) |
| *C09K 8/44* | (2006.01) |
| *E02D 3/12* | (2006.01) |
| *E02D 37/00* | (2006.01) |
| *E21B 33/138* | (2006.01) |
| *F16L 55/1645* | (2006.01) |
| *C09D 5/02* | (2006.01) |
| *E21D 11/38* | (2006.01) |

(52) U.S. Cl.
CPC .............. *C09K 8/516* (2013.01); *C09D 5/022* (2013.01); *C09D 175/14* (2013.01); *C09K 8/44* (2013.01); *C09K 8/508* (2013.01); *C09K 8/5751* (2013.01); *C09K 17/18* (2013.01); *C09K 17/48* (2013.01); *E02D 3/12* (2013.01); *E02D 37/00* (2013.01); *E21B 33/138* (2013.01); *E21D 11/38* (2013.01); *F16L 55/1645* (2013.01); *C09K 2208/14* (2013.01)

(58) Field of Classification Search
CPC .......... C09K 8/516; C09K 8/44; C09K 8/508; C09K 8/5751; C09K 17/18; C09K 17/48; C09K 2208/14; C09D 175/14; C09D 5/022; E02D 3/12; E02D 37/00; E21B 33/138; E21D 11/38; F16L 55/1645
USPC ....................................... 523/130
See application file for complete search history.

(56) References Cited

U.S. PATENT DOCUMENTS

| | | | |
|---|---|---|---|
| 4,379,071 A | 4/1983 | Schnoering et al. | |
| 6,391,440 B1 | 5/2002 | Yoshino et al. | |
| 2004/0115280 A1 | 6/2004 | Podszun et al. | |
| 2010/0263865 A1* | 10/2010 | Willberg | C08K 9/08 166/280.1 |
| 2011/0048697 A1* | 3/2011 | Lewis | C04B 20/1033 166/177.4 |
| 2012/0205102 A1* | 8/2012 | Lee | C04B 40/0633 166/282 |

FOREIGN PATENT DOCUMENTS

| | | |
|---|---|---|
| EP | 0877147 A1 | 11/1998 |
| EP | 0922834 A2 | 6/1999 |
| FR | 1113937 A | 4/1956 |
| GB | 777487 A | 6/1957 |
| GB | 1303456 A | 1/1973 |
| GB | 2226066 A | 11/1992 |
| JP | 09290146 A | 11/1997 |
| WO | 2009091909 A2 | 7/2009 |
| WO | 2011023934 A2 | 3/2011 |
| WO | 2012123011 A1 | 9/2012 |

OTHER PUBLICATIONS

Campus, E. et al.—"Polyurethane-based microparticles: Formulation and influence of processes variables on its characteristics" Journal of Microencapsulation (2008) vol. 25, pp. 154-169, Jan. 1, 2008.
JP 09-290146 A English machine translation, Ichikawa, K., Nov. 11, 1997.

* cited by examiner

*Primary Examiner* — David T Karst

(57) ABSTRACT

The present disclosure relates to aqueous gelling systems comprising an encapsulated polymerization accelerator with water soluble or dispersable monomers comprising acrylated or methacrylated polyethylene and/or polyoxypropylene monomers and a polymerization initiator dispersed in said monomers, useful i.a. for sealing subterranean environments or consolidation of a soil or sealing of a subterranean structure.

16 Claims, No Drawings

ENCAPSULATED ACTIVATOR AND ITS USE TO TRIGGER A GELLING SYSTEM BY PHYSICAL MEANS

CROSS-REFERENCE TO RELATED APPLICATIONS

This application is a divisional of U.S. patent application Ser. No. 14/004,304 filed Nov. 14, 2013 which is a U.S. national stage entry under 35 U.S.C. § 371 of International Application No. PCT/EP2012/053970 filed Mar. 8, 2012, which claims priority to EP Application No. 11157866.2 filed on Mar. 11, 2011 the whole content of this application being herein incorporated by reference for all purposes.

The current invention relates to a polyurethane encapsulated accelerator of an (meth)acrylate gelling system to be triggered by physical means such as high shear, high pressure, temperature, crushing shearing or any combination of the above, and a process for the preparation of that system.

Stopping a fluid leak located in a non-accessible spot like a buried pipe, walls of a tunnel or tank, is one of the main technical problems that operators may encounter. In severe cases, the amount of fluid lost can be very important. There is then a high risk that the leak cannot be fixed with hazardous events which might be occurred if the leaking fluid is inflammable, explosive, harmful to the environment or toxic.

In general, to solve this problem, operators decide to inject any type of plugging system such as particles, fibres or cement hoping that the leaks will be filled or obtruded and that they can restore the fluid proof in the pipe or tank. Another approach consists in developing "smart" systems which may set in a controlled way and could be injected to the leaking spot itself. There, a lot of time would be saved between initiation of the leak or spill, and repairing then resuming the flow or the storage of the fluid.

Those plugging systems can be employed especially but not exclusively, for sealing subterranean environments and for consolidation of soils and sealing of subterranean structures, such as underground railway tunnels, sewers, underground car parks, storage ponds, swimming pools, mine shafts and dams. Among the many technical solutions which have been proposed, cement grouts, silicate grouts and synthetic resin grouts can be mentioned. Synthetic resins derived from unsaturated aliphatic acids, more specifically from acrylic acid and methacrylic acid, have been also especially recommended.

Thus, Patent FR-A-1,113,937 describes the use of an acrylic acid derivative, such as acrylamide, Nalkylacrylamides, acrylonitrile alkyl acrylates and metal acrylates, and of an alkylidenediacrylamide.

A critical disadvantage of such compositions lies in the potential toxicity of some of these compounds, more particularly in the case of acrylamide based compositions.

The ecological demands of non toxicity of the products which may be in contact with water have led to the investigation of substitute compounds.

Thus, Patent GB-A-1,303,456 describes compositions containing a hydroxyalkyl acrylate or methacrylate which may be coupled with an alkylene glycol diacrylate or dimethacrylate, a soluble silver salt and a metal persulphate. These compositions cannot contain high concentrations of monomers because the exothermicity caused by their polymerisation results in a high expansion and in the formation of foams, and this interferes with some applications, especially in the case of operations for plugging cracks in subterranean structures. The major disadvantage of such composition is the control of the setting time. Indeed, in many applications leaking zones are not accessible and often far from the pumping/injection equipment. As a consequence delaying agents have been evaluated to enable the use in remote locations and even at elevated temperature as mentioned for example in GB 2226066(A)

Generally speaking no system has given fully satisfying results in terms of control accuracy and there is still a strong demand for an improved gelling system.

The instant invention relates to such an improved system and, more precisely to a process for the preparation of an encapsulated accelerator to trigger a quick gelation of a polymerizable system.

More precisely the invention relates to a process for the encapsulation of a polymerization accelerator of water soluble or water dispersable monomers (typically water soluble or dispersable monomers comprising acrylated or methacrylated polyoxyethylene and/or polyoxypropylene monomer), said process comprising the steps of
  a) providing an reverse emulsion containing, in an oil phase, a water solution or dispersion (referred as W1) containing said polymerisation activator, the oil phase being (or at least including) a heat curable mixture of an isocyanate and a polyalkyldiene hydroxylated or polyol,
  b) pouring the reverse emulsion of step a) in a water phase (referred as W2) to make a multiple emulsion water/oil/water, containing drops of activators as the internal water phase and, then,
  c) heating the multiple emulsion obtained in step b) at a temperature of between 50 and 95° C., in order to cure the polyisocyanate in polyurethane and obtain drops of activator (W1) enclosed in shells of polyurethane dispersed in water (W2).

The current invention also relates to a specific gelling system based on the encapsulated accelerator as obtained according to steps a) to c) and further comprising water soluble or water dispersable acrylated or methacrylated polyoxyethylene and/or polyoxypropylene monomers together with polymerization initiators such as peroxides.

This gelling system comprises:
  i) water soluble or dispersable monomers comprising acrylated or methacrylated polyoxyethylene and/or polyoxypropylene monomers
  ii) a polymerization initiator dispersed in said monomers i), and
  iii) a encapsulated polymerization accelerator as obtained in the process of the invention.

According to a specific embodiment the polymerization initiators ii) may be encapsulated with the accelerator iii). In that case, the initiators and the accelerator are generally both in the internal water phase inside the capsules obtained according to the process of the invention. Such a co-encapsulation may be obtained e.g. by providing in step a) of the process of the invention an emulsion which comprise both the initiators and the accelerator in the water solution or dispersion (W1).

Whatever the exact nature of the gelling system, the gelling operation is carried out through a polymerization reaction initiated by release of the previously encapsulated accelerator in the water soluble or dispersable resin. In order to achieve that release at the appropriate timing for the application, the accelerator is encapsulated before use, by the multiple emulsion process of the current invention. This release is obtained by any physical means allowing a release of the polymerization accelerator from their polyurethane capsules, for example by high shear; high pressure; temperature crushing; and/or shearing.

Optionally, in step a), a solvent or plasticizer can be added to the oil phase. This solvent or plasticizer may for example be di-isobutyl ester of succinate glutarate or adipate. The addition of solvent or plasticizer allows to tune the mechanical properties of the polyurethane shells.

Optionally in step a), a non-ionic surfactant is added to the water phase W1, wherein said activator is dispersed or in solution. The non-ionic surfactant can be for example a di-$C_1$-$C_8$ alkyl ester of a saturated or unsaturated fatty acid having 12 to 22 carbon atoms.

Preferably, the water phase W2 of step b) contains a mineral salt, for example NaCl and xanthan gum or another similar polymer. The mineral salt is used in order to balance the osmotic pressure to prevent the reverse emulsion of step a) from bursting. Xanthan gum is used as protective colloid and rheological agent. Any other similar polymer may be used, including, e.g., gelatin, pectin derivative of cellulose, Arabic gum, guar gum, locust bean gum, tara gum, cassia gum, agar, modified starch such as n-octenyl starch or porous starch alginates, carraghenanes, chitosan, scleroglucan, diutan polyvinyl alcohol polyvinyl pyrrolidone and mixtures thereof.

The polymerization accelerator which is used in the process and in the gelling system of the instant invention is advantageously a compound which accelerates the polymerization of water soluble or water dispersable monomers comprising acrylated or methacrylated polyoxyethylene and/or polyoxypropylene monomer (also called "macromonomers" due to the presence of polyoxyethylene and/or polyoxypropylene chain in the monomer).

The polymerization accelerator which is used in the process of water soluble or water dispersable macromonomers having the following general formula (I):

$$CH_2=CR^1-CO-(O-CH_2-CHR^2)_n-OR^3 \quad (I)$$

wherein:
$R^1$ is a hydrogen atom or a methyl radical,
$R^2$ is a hydrogen atom or a methyl radical and
$R^3$ is a hydrogen atom, a methyl radical or a $CH_2=CR^1-CO-$ group
n is a whole or fractional number from 3 to 25.

The gelling system of the invention preferably include such water soluble or dispersable macromonomers of formula (I).

Preferred water soluble or water dispersable monomers include a mixture of methacrylate modified polyethylene oxide. Polyethyleneoxide chain is here about 1000 g/mol so short chains are not hydrophilic enough balance the hydrophobicity of the methacrylate end groups (especially at high temperature and high salinity) on the other hand, longer chains lead to less reactive molecules Advantageous monomers are of the formulae

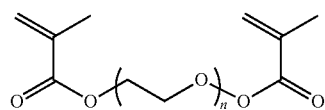

wherein n is a number between 15 and 25, limits included, and/or

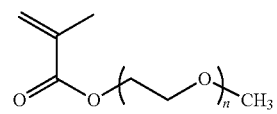

wherein n is a number between 10 and 20, limits included.

In addition, these monomers are non-volatile, classified as polymers and show no toxicity.

According to a specific embodiment, the water soluble or water dispersable monomers used in the composition of the invention is a mixture comprising at least two distinct kinds of monomers of formula (I), namely a first part of monomers wherein $R^3$ is a methyl radical (herein referred to as monofunctional monomers I-1); and a second part of monomers wherein $R^3$ is a $CH_2=CR^1-CO-$ group (herein referred to as bisfunctional monomers I-2). According to an economical process, this mixture of monomers may advantageously be prepared by reacting a mixture of two compounds (A1) and (A2) Having the following formulae:

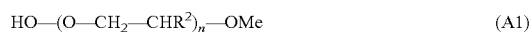
$$HO-(O-CH_2-CHR^2)_n-OMe \quad (A1)$$

$$HO-(O-CH_2-CHR^2)_n-OH \quad (A2)$$

wherein $R^2$ is as defined above,
with a (meth)acrylic acid, chloride or anhydride (preferably an anhydride), typically a (meth)acrylic anhydride of formula $(CH_2=CR^1-C)_2O$ wherein $R^1$ is as defined above.

Advantageously, in this preparation process, compounds (A1) and (A2) are used so as to obtain a mean number of OH group of between 1.1 and 1.5 (A1 bears one OH and (A2) bears two). In this connection, it is typically preferred for the molar ratio (A2)/(A1) to be of between 10:90 to 50:50.

Depending on the end use temperature conditions, either water soluble persalts like sodium persulphate or ammonium persulphate for low temperature (10 to 40° C. or water soluble or water dispersible peroxides like tertiobutyl hydroperoxide (TBHP) tertio amyl hydroperoxide and cumene hydroperoxide for temperature above 40° C. are used as polymerization initiators and mixed with the monomers without any reaction within at least 2 to 3 hours at the target temperature. The polymerization reaction of the monomers can easily be triggered by the addition to said monomers of an amine accelerator. A stiff gels sets then within a few minutes to a few hours depending on targeted application and on how far from the injection point versus pumping rate. The gel plug is to be placed, with the combined action of the initiator and accelerator whose concentrations are adapted to the conditions (essentially the temperature) of the monomers in the gelling remote location.

The mixture of:
i) water soluble or dispersable monomers comprising an acrylate or methacrylate polyoxyethylene and/or polyoxypropylene monomer, and
ii) polymerization initiators dispersed in i)
is stable in the storage or injection conditions but starts to polymerize upon addition and contact with the accelerator in the pressure and temperature conditions of the remote location to be treated.

The polymerisation accelerator, also called an activator, is generally an amino compound like an alkylamine, polyalkylen amine or poly alkylen imine preferably comprising tertiary amino groups and whose alkyl or alkylen part comprises 2-4 carbon atoms.

Primary or secondary amines or amine hydrochlorides can also be employed but the polymerisation rate obtained with these accelerators is lower than with tertiary amines.

The amine polymerisation accelerator may include other chemical functional groups in its formula such as, for example nitrile or hydroxyl or ester functional groups.

The ester functional groups may, in particular, originate from the esterification with acrylic acid or methacrylic acid of one or more hydroxyl functional groups present in the formula of the amine.

Among the preferred tertiary amines there may be mentioned diethylaminopropionitrile, triethanolamine, dimethylaminoacetonitrile, diethylenetriamine, N,N-dimethylaniline, dimethylaminoethyl methacrylate dimethylaminoethyl acrylate, triethanolamine methacrylate and triethanolamine acrylate.

A preferred accelerator is a polyethyleneimine (PEI) commercially available from BASF under the name of Lupasol®.

The accelerator is usually used at levels from 0.01% to 10% by weight over the weight of the polymerizable monomers, and preferably from 0.1% to 1.0%. Other accelerators, catalysts or co-accelerators can be used like metal ions such as copper or iron as catalysts of the activation.

The isocyanates for which the invention is most advantageous are alpha omega-aliphatic diisocyanates.

These aliphatic diisocyanates, to be condensed with polyamines/polyols, are either isocyanate molecules, referred to as monomers, that is to say non poly-condensed, or heavier molecules resulting from one or more oligocondensation(s), or mixtures of the oligocondensates, optionally with monomer.

As will be clarified subsequently, the commonest oligo-condensates are biuret, the dimer and the trimer (in the field under consideration, the term "trimer" is used to describe the mixtures resulting from the formation of isocyanuric rings from three isocyanate functional groups, in fact, there are, in addition to the trimer, heavier products are produced during the trimerization reaction). Mention may in particular be made, as monomer, of polymethylene diisocyanates, for example, TMDI (TetraMethylene Diisocyanate) and HDI (Hexamethylene Diisocyanate of the formula OCN—$(CH_2)_6$—NCO and its isomers (methylpentamethylene diisocyanate)]

It is desirable, in the structure of the or of one of the isocyanate monomer(s), for the part of the backbone connecting two isocyanate functional groups to comprise at least one polymethylene sequence. Mention may also be made of the compounds resulting from the condensation with diols and triols (carbamates and allophanates) under substoichiometric conditions. Thus, in the isocyanate compositions, it is possible to find isocyanurate functional groups, which can be obtained by catalyzed cyclocondensation of isocyanate functional groups with themselves, urea functional groups, which can be obtained by reaction of isocyanate functional groups with water or primary or secondary amines, biuret functional groups, which can be obtained by condensation of isocyanate functional groups with themselves in the presence of water and of a catalyst or by reaction of isocyanate functional groups with primary or secondary amines, urethane functional groups, which can be obtained by reaction of isocyanate functional groups with hydroxyl functional groups.

The shells of polyurethane obtained in step c) have typically an average diameter of between 10 and 1500 μm, preferably between 300 and 800 μm.

The instant invention furthermore relates to a process for sealing subterranean environments and consolidation of soils and sealing of subterranean structures comprising underground railway tunnels, sewers, underground car parks storage ponds, swimming pools, mine shafts and dams.

This process comprises the steps of:
e1) injecting into said environments soil or structure an aqueous gelling system as defined above, comprising a polymerization accelerator encapsulated in polyurethane capsules and monomers, and
e2) triggering the polymerisation of the resin by physical means, for example high shear, high pressure, temperature, crushing, and/or shearing, whereby the encapsulated polymerization accelerator is released from the polyurethane capsules.

The invention will now be further illustrated by the following illustrative examples.

EXAMPLE 1

A specific gelling system was prepared by following the following steps:

Step a):

the aqueous solution of Polyethyleneimine (PEI, Lupasol P from BASF) is dispersed in mixture of OH functionalized butadiene (Poly BD R45HT-LO from Sartomer), isophorone di-isocyanate trimer supplied diluted with 30% wt butyl acetate (Tolonate IDT 70B from Perstorp) and diluted with Rhodiasolv DIB (succinate, glutarate, adipate diisobutyl ester from Rhodia).

In order to ease the emulsification process, the emulsion of PEI in OH functional butadiene diluted with DIB is first made, and, then, the isocyanate is added to the already formed emulsion.

The particle size of the emulsion is set by acting on the agitation speed.

The different quantities of ingredients are gathered in the following table 1:

TABLE 1

| Ingredients | Weight (g) |
| --- | --- |
| OH functionalized butadiene Poly BD R45HT-LO from Sartomer | 186.9 |
| DIB | 186.9 |
| PEI | 532.7 |
| Tolonate IDT 70B from perstorp | 93.5 |
| Total | 1000.0 |

The mixing time after the addition of isocyanate is set to 5 mn. As a consequence, the reverse emulsion is quickly transferred to the aqueous phase to form the multiple emulsion of step b)

Step b)

The reverse emulsion from step a) is then dispersed under vigorous stirring conditions to achieve the multiple emulsion. A very good and homogeneous mixing efficiency is needed at that stage to maintain a particle size distribution as narrow as possible.

To stabilize the suspension and avoid bursting of the capsules while the polyurethane is not fully crosslinked the dispersion is made in a salted xanthan solution. The salt (here NaCl at 20% wt) ensure the osmotic pressure balance between the inner PEI and outer xanthan solution phases. A mismatch of osmotic pressure would cause a burst of the inverse emulsion. Xanthan is used here as a "protective colloid" and rheological agent. Indeed, it shows very good suspensive properties as well as stabilization of the emulsion in salt water and even at elevated cure temperature (up to 80° C. here).

As long as an homogeneous mixing is ensured during step b), the particle size distribution is directly linked to the mixing speed. Here a rotation speed of 280 RPM gives a particle size of approx 400 μm.

Typical operating conditions are reported here below:
transfer of emulsion of step a) to the reactor (containing the 0.45% wt xanthan in 20% wt NaCl water solution) under shear 280 RPM heated to 66° C. (envelope temperature)
after addition maintain agitation at 280 RPM for 15 mn
reduce speed to minimal 37 RPM and maintain for 2 hrs for curing of the elastomer For 1000 g emulsion from step 1 quantities necessary for the second step are reported in table 2 below:

| ingredients | weight(g) |
| --- | --- |
| deionized water | 700.7 |
| xanthan (Rhodopol 23P) | 4.0 |
| NaCl Normapur | 177.0 |
| Total | 881.7 |

EXAMPLE 2

In a nitrogen rented round bottom flask, a mixture of methoxy polyethylene glycol (M=750 g/mol) and polyethylene glycol (M=1000 g/mol) respectively 67% and 33% by weight was poured at 50° C. Methoxy polyethylene glycol and polyethylene glycol are bearing respectively 1 and 2 OH function per molecule. The necessary quantity of methacrylic anhydride (AM2O) to get a molar ratio of AM2O/OH=1 is added to the reaction medium. Prior use, AM20 was stabilized with 1000 ppm phenothiazine and 1000 ppm topanol.

The quantities and the nature of the used products are reported in the table 3 below:

| supplier | purity | M (g/mol) | m(g) |
| --- | --- | --- | --- |
| methacrylic anhydride AM2O Aldrich | 94% | 154.16 | 25.5 |
| PEG 1000 Fluka | 100% | 1000 | 33 |
| methoxy PEG 750 Aldrich | 100% | 750 | 67 |
| phenothiazine Acros | 99% | 199.3 | 0.024 |
| topanol A brenntag | 78.5-100% | 178 | 0.024 |

The reaction medium was heated up to 80° C. for 10 hrs under stirring of a magnetic bar (with an expected yield of esterification is 80%).

Flask was then placed under vacuum (30 mbars) and heated to 90° C. Under these pressure and temperature conditions, produced methacrylic adic was removed by vapor stripping. Stripping was considered as complete when residual methacrylic acid content is below 2%. The obtained product is diluted with water to 70%. This material will hereinafter be referred to as "PEO-methacrylate monomers".

EXAMPLE 3

The capsules from example 1 are formulated with a PEO-methacrylate monomers from example 2.

Formulations are thickened using hydroxyl-ethyl cellulose (HEC) Cellosize 10-HV from Dow. The solid polymer is hydrated for at least 1 hr under stirring in de-ionized water at 0.5% wt prior use.

Other components are gently mixed together in quantities as reported in table 4 below:

| formulation | formulation #2-1 m (g) | formulation #2-2 m (g) |
| --- | --- | --- |
| PEO-methacrylate monomers | 3.75 | 3.75 |
| HEC at 0.5% | 21.25 | 21.25 |
| Sodium persulfate | 0.125 | 0.25 |
| capsules from example 1 | 0.25 | 0.25 |

Half of each formulation is sheared for 10 secs at 16000 RPM using a rotor stator blender (Ultra-Turrax 125 basic from IKA). Solution of both sheared and un-sheared formulations are then let set at 21° C. and setting times are reported in table 5 below.

| | formulation #2-1 | formulation #2-2 |
| --- | --- | --- |
| Sheared ultra turrax | gelification after 105 mn | gelification after 65 mn |
| un-sheared | gelification after 25 hrs | gelification after 21 hrs |

The results gathered in the above table, shows that shear from rotor stator blender can release the polymerization activator and induce gelification of the formulation.

EXAMPLE 4: HIGH TEMPERATURE FORMULATION

In order to ensure a proper temperature stability for the POE-methacrylate monomers at high temperature, a more thermally stable oxidizer is used and an extra inhibitor is added to the system. The inhibitor used here is the 4-Hydroxy-2,2,6,6-tetramethylpiperidine 1-oxyl (or hydroxyl-TEMPO)

The capsules from example 1 are formulated with a PEO-methacrylate monomers from example 2.

Formulations are thickened using hydroxyl-ethyl cellulose (HEC) Cellosize 10-HV from Dow. The solid polymer is hydrated for at least 1 hr under stirring in de-ionized water at 0.5% wt prior use.

Other components are gently mixed together in quantities as reported in table 6 below.

| Formulation | formulation #3-1 m (g) |
| --- | --- |
| PEO-methacrylate monomers | 3.75 |
| HEC at 0.5% | 21.25 |
| tertiobutyl hydroperoxide @ 70% in water | 0.10 |
| capsules from example 1 | 0.25 |
| Hydroxy-TEMPO @ 1% in water | 0.19 |

Then half of the formulation is sheared for 10 secs at 16000 RPM using a rotor stator blender (Ultra-Turrax T25 basic from IKA). Solution of both sheared and un-sheared formulations are placed in an oven heated at 80° C. and setting times are reported in table below.

|                    | formulation #3 |
|--------------------|----------------|
| sheared ultra turrax | 45 mn       |
| un-sheared         | 210 mn         |

Considering that in the oven, samples take about 60 minutes to reach 80° C. and are at 65° C. after 45 mn, the above shows that a sheared sample is activated very quickly once at elevated temperature while an un-sheared sample remains stable for a couple of hours at 80° C. without any reaction.

The invention claimed is:

1. An aqueous gelling system comprising:
    i) water soluble or dispersable monomers comprising acrylated or methacrylated polyoxyethylene and/or polyoxypropylene monomers
    ii) a polymerization initiator dispersed in said monomers i), and
    iii) an encapsulated polymerization accelerator comprising drops of activator enclosed in shells of polyurethane dispersed in water, wherein the shells of polyurethane have an average diameter between 300 and 1500 μm, wherein the polymerisation accelerator is an alkylamine, polyalkylenamine, or polyalkylenimine.

2. The aqueous gelling system of claim 1,
wherein the encapsulated polymerization accelerator is obtained in a process comprising the steps of:
    a) providing a reverse emulsion containing, in an oil phase, a water solution or dispersion (W1) containing said polymerisation accelerator, the oil phase including a heat curable mixture of an isocyanate and a hydroxylated polyalkyldiene or polyol,
    b) pouring the reverse emulsion of step a) in a water phase (W2) to make a water/oil/water multiple emulsion, containing drops of the water solution or dispersion comprising the accelerator as the internal water phase and, then,
    c) curing the mixture of isocyanate and hydroxylated polyalkyldiene or polyol in the multiple emulsion obtained in step b) to obtain polyurethane and enclose the drops of the water solution or dispersion comprising the accelerator in shells of the polyurethane dispersed in water, wherein the shells of polyurethane have an average diameter between 300 and 1500 μm.

3. The gelling system of claim 2, wherein the hydroxylated polyalkyldiene or polyol is a hydroxylated polybutadiene.

4. The gelling system as claimed in claim 2, wherein the isocyanate is a trimer form of alpha, omega aliphatic diisocyanate.

5. The gelling system of claim 2, wherein the polymerisation accelerator is a polyethyleneimine (PEI).

6. The gelling system of claim 2, wherein a further polymerization initiator is encapsulated with the polymerization accelerator, wherein the polymerization initiator is selected from the group consisting of water soluble persalts and/or peroxides.

7. The gelling system of claim 2, wherein the water soluble or water dispersable acrylated or methacrylated polyoxyethylene and/or polyoxypropylene monomers have the general formula:

$$CH_2=CR^1-CO-(O-CH_2-CHR^2)n-OR^3 \quad (1)$$

wherein:
$R^1$ is a hydrogen atom or a methyl radical,
$R^2$ is a hydrogen atom or a methyl radical, and
$R^3$ is a hydrogen atom, a methyl radical, or a $CH_2=CR^1-CO-$ group, and
n is a whole or fractional number from 3 to 25.

8. The gelling system of claim 7, wherein the water soluble or water dispersable acrylated or methacrylated polyoxyethylene and/or polyoxypropylene monomers is a mixture of methacrylate modified polyethylene oxide of the formulae:

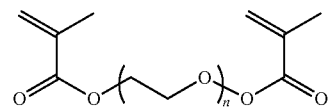

wherein n is a number between 15 and 25, limits included, and/or

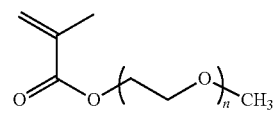

wherein n is a number between 10 and 20, limits included.

9. The gelling system of claim 7, wherein the water soluble or water dispersable monomers is a mixture comprising at least two distinct kinds of monomers, obtained by reacting a mixture of two compounds (A1) and (A2) having the following formulae:

$$HO-(O-CH_2-CHR^2)_n-OMe \quad (A1)$$

$$HO-(O-CH_2-CHR^2)_n-OH \quad (A2)$$

wherein $R^2$ and n are as defined in claim 7 and Me is a methyl radical, with a (meth)acrylic acid, chloride or anhydride.

10. The gelling system of claim 9, wherein the molar ratio (A2)/(A1) is from 10:90 to 50:50.

11. The gelling system of claim 9, wherein the (meth)acrylic anhydride is a (meth)acrylic anhydride of formula $(CH_2=CR^1-C(O))_2O$ wherein $R^1$ is as defined in claim 7.

12. The gelling system of claim 2, wherein the polymerisation accelerator is an alkylamine, polyalkylenamine or polyalkylenimine comprising tertiary amino groups and whose alkyl or alkylen part comprises 2-4 carbon atoms.

13. The gelling system of claim 2, wherein the isocyanate is alpha, omega aliphatic diisocyanate.

14. The gelling system of claim 2, wherein the shells of polyurethane have an average diameter between 300 and 800 μm.

15. A process for sealing subterranean environments and consolidation of a soil or sealing of a subterranean structure, comprising underground railway tunnels, sewers, underground car parks, storage ponds, swimming pools, oil wells, mine shafts and dams, comprising the steps of:
    e1) injecting into said environments soil or structure an aqueous gelling system of claim 1; and
    e2) triggering the polymerisation of the resin by physical means, whereby the encapsulated polymerization accelerator is released from the polyurethane capsules.

16. The process of claim 15, wherein said physical means is selected from the group consisting of high shear, high pressure, temperature, crushing, shearing, and any combination thereof.

* * * * *